(12) United States Patent
Yoshioka et al.

(10) Patent No.: US 10,020,667 B2
(45) Date of Patent: Jul. 10, 2018

(54) CHARGING CIRCUIT FOR CHARGING A CAPACITOR

(71) Applicant: AISIN SEIKI KABUSHIKI KAISHA, Kariya-shi, Aichi-ken (JP)

(72) Inventors: Ryo Yoshioka, Ann Arbor, MI (US); Hiroto Kimura, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 127 days.

(21) Appl. No.: 15/190,814

(22) Filed: Jun. 23, 2016

(65) Prior Publication Data
US 2017/0018944 A1   Jan. 19, 2017

(30) Foreign Application Priority Data
Jul. 15, 2015  (JP) .................................. 2015-141483

(51) Int. Cl.
*H01M 10/46* (2006.01)
*H02J 7/00* (2006.01)
*H02J 7/34* (2006.01)

(52) U.S. Cl.
CPC .......... *H02J 7/0077* (2013.01); *H02J 7/0073* (2013.01); *H02J 7/345* (2013.01)

(58) Field of Classification Search
CPC ................ H02J 7/04; H02J 7/34; H02J 7/345
USPC ..................................... 320/107, 166; 307/66
See application file for complete search history.

(56) References Cited

U.S. PATENT DOCUMENTS

| 4,555,655 A | * | 11/1985 | Tanaka .................. | H03H 11/24 307/109 |
| 4,969,077 A | * | 11/1990 | Plagge .................... | H02J 7/022 320/164 |
| 5,786,685 A | * | 7/1998 | Lange ...................... | H02J 9/06 307/66 |

FOREIGN PATENT DOCUMENTS

JP    2000-289452 A    10/2000
JP    2012-60697 A     3/2012

* cited by examiner

*Primary Examiner* — Edward Tso
(74) *Attorney, Agent, or Firm* — Sughrue Mion, PLLC (57) ABSTRACT

A charging circuit that charges a capacitor using the power that is output from a power supply, includes: first and second PNP-type transistors; first and second resistors; and a current path maintaining unit, wherein the power supply is connected to the emitter terminal of the first PNP-type transistor, the first resistor is connected between the emitter terminal and the base terminal of the first PNP-type transistor, the capacitor is connected to the collector terminal of the second PNP-type transistor, the second resistor is connected between the collector and base terminals of the second PNP-type transistor, the base terminal and the collector terminal of the first PNP-type transistor are respectively connected to the emitter terminal and the base terminal of the second PNP-type transistor, and the current path maintaining unit is provided between the collector terminal of the first PNP-type transistor and the emitter terminal of the second PNP-type transistor.

10 Claims, 4 Drawing Sheets

CHARGING CIRCUIT FOR CHARGING A CAPACITOR

CROSS REFERENCE TO RELATED APPLICATIONS

This application is based on and claims priority under 35 U.S.C. § 119 to Japanese Patent Application 2015-141483, filed on Jul. 15, 2015, the entire contents of which are incorporated herein by reference.

TECHNICAL FIELD

This disclosure relates to a charging circuit that charges a capacitor.

BACKGROUND DISCUSSION

When a capacitor is charged, an inrush current is generated at the time of applying a voltage. As a method for suppressing the inrush current, a method that reduces the peak value of the inrush current by a resistor which is inserted into a power supply line is disclosed. However, in the case of reducing the inrush current by the resistor, taking the allowable power dissipation of the resistor into consideration, it is necessary to use a so-called high-power resistor, and this leads to an increase in cost and size. Therefore, in order to suppress such an increase in cost and size, a constant current circuit that is configured with a small bipolar transistor has been used (for example, JP 2000-289452A (Reference 1) and JP 2012-60697A (Reference 2)).

In the Reference 1, an energization device that charges the capacitor of an electric car air conditioning apparatus is disclosed. In the energization device, the emitter terminal of an output transistor is connected to the base terminal of a control transistor, and the base terminal of the output transistor is connected to the collector terminal of the control transistor. A resistor and a zener diode are provided between the base terminal and the emitter terminal of the control transistor. The constant current value is set by the sum of the base-emitter voltage and the zener voltage and the resistor.

In the Reference 2, a constant current circuit for charging is disclosed. In the constant current circuit for charging, the collector terminal of a first transistor is connected to the base terminal of a second transistor, and the base terminal of the first transistor is connected to the emitter terminal of the second transistor. A resistor and a diode are provided between the base terminal and the emitter terminal of the first transistor, and the constant current value is set by the difference between the base-emitter voltage and the forward voltage of the diode and the resistor.

According to the circuits described in the References 1 and 2, the charging current of the capacitor can be restricted to a predetermined current value. Therefore, the inrush current can be suppressed. However, when the voltage of the positive terminal of the capacitor becomes high according to the charging and the charging current becomes excessively smaller than the predetermined current value, the output transistor in the Reference 1 is turned-off, and the second transistor in the Reference 2 is turned-off. In this case, the subsequent charging current becomes small to the extent of the leakage current of each transistor (for example, μA order), and this leads to significantly increase the time until the inter-terminal voltage of the capacitor reaches to the power supply voltage.

SUMMARY

Thus, a need exists for a charging circuit which is not suspectable to the drawback mentioned above.

A feature of a charging circuit according to an aspect of this disclosure for charging a capacitor using the power that is output from a power supply resides in that the charging circuit includes a first PNP-type transistor, a second PNP-type transistor, a first resistor, a second resistor, and a current path maintaining unit, in which the power supply is connected to the emitter terminal of the first PNP-type transistor, in which the first resistor is connected between the emitter terminal of the first PNP-type transistor and the base terminal of the first PNP-type transistor, in which the capacitor is connected to the collector terminal of the second PNP-type transistor, in which the second resistor is connected between the collector terminal of the second PNP-type transistor and the base terminal of the second PNP-type transistor, in which the base terminal of the first PNP-type transistor is connected to the emitter terminal of the second PNP-type transistor, in which the collector terminal of the first PNP-type transistor is connected to the base terminal of the second PNP-type transistor, in which the second PNP-type transistor outputs a current of a predetermined set current value or less, in which the current path maintaining unit is provided between the collector terminal of the first PNP-type transistor and the emitter terminal of the second PNP-type transistor, and in which a current path from the power supply to the capacitor is formed using the first resistor, the second resistor, and the current path maintaining unit.

A feature of a charging circuit according to another aspect of this disclosure for charging a capacitor using the power that is output from a power supply resides in that the charging circuit includes a first NPN-type transistor, a second NPN-type transistor, a first resistor, a second resistor, and a current path maintaining unit, in which the capacitor is connected to the emitter terminal of the first NPN-type transistor, in which the first resistor is connected between the emitter terminal of the first NPN-type transistor and the base terminal of the first NPN-type transistor, in which the power supply is connected to the collector terminal of the second NPN-type transistor, in which the second resistor is connected between the collector terminal of the second NPN-type transistor and the base terminal of the second NPN-type transistor, in which the base terminal of the first NPN-type transistor is connected to the emitter terminal of the second NPN-type transistor, in which the collector terminal of the first NPN-type transistor is connected to the base terminal of the second NPN-type transistor, in which the second NPN-type transistor outputs a current of a predetermined set current value or less, in which the current path maintaining unit is provided between the collector terminal of the first NPN-type transistor and the emitter terminal of the second NPN-type transistor, and in which a current path from the power supply to the capacitor is formed using the first resistor, the second resistor, and the current path maintaining unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

When a capacitor is charged using the power that is output from a power supply, a charging circuit according to the embodiment disclosed here is configured to shorten the time until the inter-terminal voltage of the capacitor reaches to the output voltage of the power supply (power supply voltage).

1. First Embodiment

Figure 1:
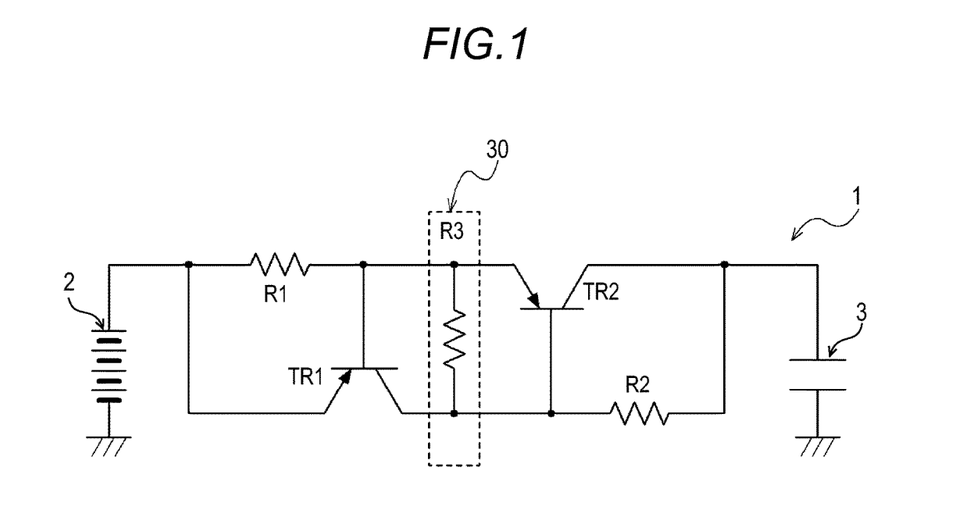
FIG. 1 is a circuit diagram of a charging circuit according to a first embodiment.

Hereinafter, a charging circuit 1 according to the present embodiment will be described. FIG. 1 illustrates a circuit diagram of the charging circuit 1 according to the present embodiment. As illustrated in FIG. 1, the charging circuit 1 is configured to include a first PNP-type transistor TR1 (hereinafter referred to as "transistor TR1"), a second PNP-type transistor TR2 (hereinafter referred to as "transistor TR2"), a first resistor R1 (hereinafter referred to as "resistor R1"), a second resistor R2 (hereinafter referred to as "resistor R2"), and a current path maintaining unit 30.

The emitter terminal of the transistor TR1 is connected to the positive terminal of a power supply 2. The resistor R1 is connected between the emitter terminal of the transistor TR1 and the base terminal of the transistor TR1. The collector terminal of the transistor TR2 is connected to the positive terminal of a capacitor 3. The resistor R2 is connected between the collector terminal of the transistor TR2 and the base terminal of the transistor TR2. The base terminal of the transistor TR1 is connected to the emitter terminal of the transistor TR2, and the collector terminal of the transistor TR1 is connected to the base terminal of the transistor TR2.

The transistor TR2 outputs a current of a predetermined set current value or less. Here, when the transistor TR1 is in an operation state, the current of the value obtained by dividing the base-emitter voltage of the transistor TR1 by the resistance value of the resistor R1, flows through the resistor R1. Therefore, the "predetermined set current value" corresponds to the current value obtained by dividing the base-emitter voltage of the transistor TR1 ("0.6V" as a typ value) by the resistance value of the resistor R1. In other words, the set current value is set by the resistor R1 and the transistor TR1. The current is output as the collector current of the transistor TR2.

According to the configuration, when the collector current of the transistor TR1 flows, the capacitor 3 is mainly charged by the collector current of the transistor TR2. When the capacitor 3 is charged and the voltage Vc of the positive terminal of the capacitor 3 becomes high, the current that flows through the resistor R1 becomes low, and thus the transistor TR1 is in a non-operation state. At this time, only the transistor TR2 is in an operation state. However, even at that time, the capacitor 3 is mainly charged by the collector current of the transistor TR2. Further, when the voltage Vc of the positive terminal of the capacitor 3 becomes high, the transistor TR2 is in a non-operation state.

The current path maintaining unit 30 is provided between the collector terminal of the transistor TR1 and the emitter terminal of the transistor TR2. Accordingly, even when the transistor TR1 and the transistor TR2 are in a non-operation state, a series circuit is constituted by the resistor R1, the resistor R2, and the current path maintaining unit 30. Thus, the current path maintaining unit 30 maintains (forms) the current path until the current that is output from the power supply 2 reaches to the capacitor 3. In the present embodiment, the current path maintaining unit 30 is configured with a third resistor R3 (hereinafter referred to as "resistor R3").

Figure 2:
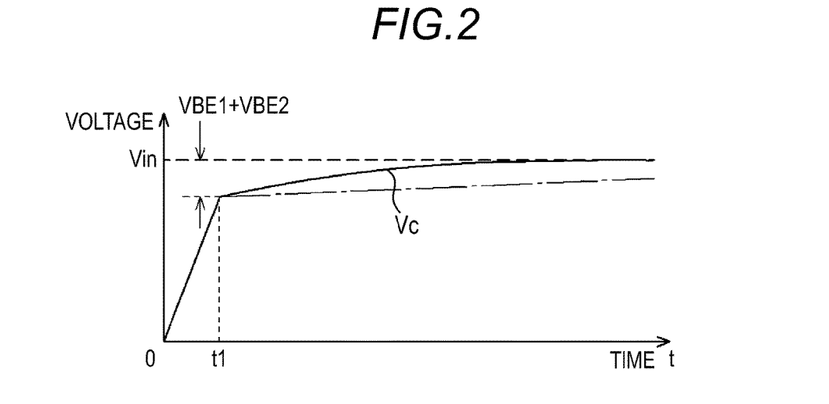
FIG. 2 is a diagram illustrating the change in the inter-terminal voltage of a capacitor.

FIG. 2 illustrates the waveform of the voltage Vc of the positive terminal of the capacitor 3 when the capacitor 3 is charged by the charging circuit 1. As illustrated in FIG. 2, when the charging is performed from the state where electric charges are not stored in the capacitor 3 (t=0), until the voltage of the positive terminal of the capacitor 3 becomes "Vin−VBE1−VBE2" (t=t1), the capacitor 3 is charged via the resistor R1 and the transistor TR2 using the constant current that is set by the resistor R1. Here, Vin is the output voltage of the power supply 2, VBE1 is the base-emitter voltage of the transistor TR1 in an operation state, and VBE2 is the base-emitter voltage of the transistor TR2 in an operation state.

When the voltage Vc of the positive terminal of the capacitor 3 becomes high, the transistor TR1 is in a non-operation state, and only the transistor TR2 is in an operation state. At this time, the capacitor 3 is mainly charged by the collector current of the transistor TR2. Further, when the voltage Vc of the positive terminal of the capacitor 3 becomes high, the transistor TR2 is in a non-operation state.

Here, as the resistor R2 and the resistor R3, the resistor having a resistance value that is two or more orders of magnitude larger than the resistance value of the resistor R1 is used. Therefore, in a case where the transistor TR1 and the transistor TR2 are in a non-operation state, the charging is performed with the current smaller than the current when the transistor TR1 and the transistor TR2 are in an operation state. Even in the case, the inter-terminal voltage of the capacitor 3 can be quickly reached to the power supply voltage, compared to the voltage waveform illustrated by the dashed line in FIG. 2 when the charging is performed using a charging circuit without the current path maintaining unit 30.

2. Second Embodiment

In the embodiment described above, the configuration in which the current path maintaining unit 30 is configured with the resistor R3 is described. However, in the present embodiment, the configuration is different than that of the first embodiment in that the resistance value of the resistor R3 can be changed. The other configurations are similar to those of the first embodiment. Hereinafter, the main differences will be described.

Figure 3:
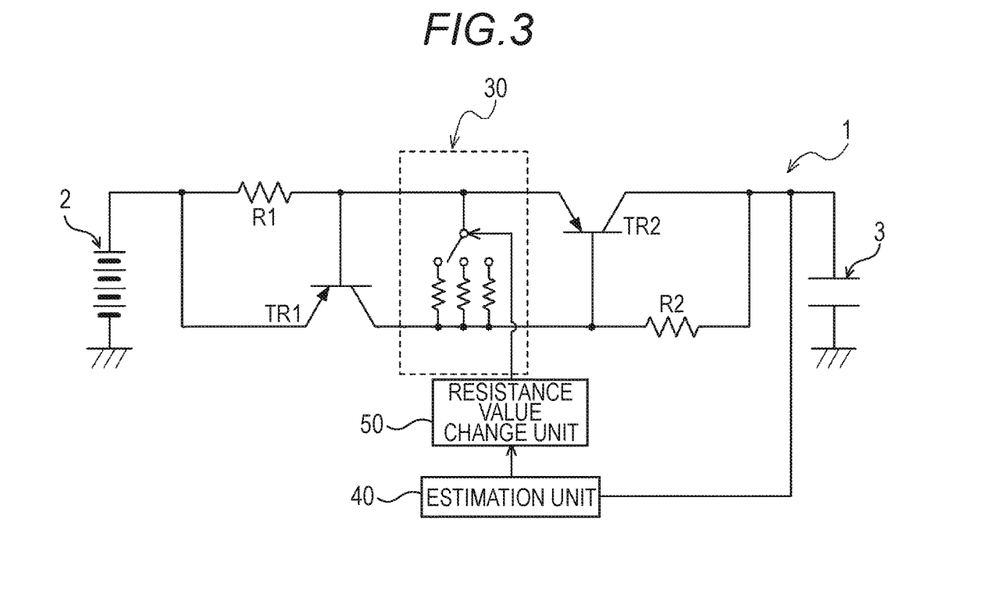
FIG. 3 is a circuit diagram of a charging circuit according to a second embodiment.

FIG. 3 illustrates a circuit diagram of a charging circuit 1 according to the present embodiment. As illustrated in FIG. 3, the charging circuit 1 according to the present embodiment is configured to include a transistor TR1, a transistor TR2, a resistor R1, a resistor R2, a current path maintaining unit 30, an estimation unit 40, and a resistance value change unit 50. The transistor TR1, the transistor TR2, the resistor R1, and resistor R2 are the same as those of the first embodiment, and thus the description thereof is omitted.

The current path maintaining unit 30 is configured with a resistor. This resistor is configured such that the resistance value thereof can be changed. The resistor may be configured with a plurality of resistors arranged in parallel, or may be configured with a variable resistor. When the resistor is configured with the plurality of resistors arranged in parallel, the resistance value thereof can be changed by a switch. When the resistor is configured with the variable resistor, the resistance value thereof can be changed according to a control signal from outside, for example, as in a digital potentiometer.

The resistance value of the resistor of the current path maintaining unit 30 is set based on the set current value. However, the current of the current path maintaining unit 30 differs depending on the capacitance value of the capacitor 3. On the other hand, since the capacitor 3 deteriorates over time due to, for example, temperature, the capacitance value thereof decreases. Therefore, the current that is output from the transistor TR1 is changed according to the deterioration state of the capacitor 3.

Therefore, the estimation unit 40 estimates the current capacitance value of the capacitor 3 based on the time constant τ of the capacitor 3. As known, in the RC series circuit in which the resistor and the capacitor are connected to each other in series, the time constant τ of the capacitor 3 is an index that indicates the reference of the temporal variation in the voltage of the positive terminal of the capacitor or in the current flowing through the capacitor. The time constant τ of the capacitor can be obtained by "resistance value×capacitance value" or by the slope of the initial period of the waveform such as charge characteristics and discharge characteristics.

In the present embodiment, the estimation unit 40 estimates the capacitance value C by the following equation (1).

$$C = I/Vc \times t \qquad (1)$$

Here, t is the elapsed time from the start of charging, Vc is the voltage of the positive terminal of the capacitor 3 when the time t has elapsed from the start of charging, and I is the current (charging current) flowing through the capacitor 3. The result estimated by the estimation unit 40 is transferred to the resistance value change unit 50.

The resistance value change unit 50 sets the resistance value of the resistor based on the capacitance value estimated by the estimation unit 40. More specifically, as the estimated capacitance value becomes larger, the resistance value change unit 50 sets the resistance value of the resistor of the current path maintaining unit 30 to be larger, and as the estimated capacitance value becomes smaller, the resistance value change unit 50 sets the resistance value of the resistor of the current path maintaining unit 30 to be smaller. Accordingly, when the estimated capacitance value is large, the voltage of the positive terminal of the capacitor 3 quickly reaches to a predetermined voltage, and when the estimated capacitance value is small, after the transistor TR1 and the transistor TR2 are in a non-operation state, the charging current larger than the leakage current of the transistor TR1 and the transistor TR2 is ensured. Thus, it is possible to shorten the time until the voltage of the positive terminal of the capacitor reaches to the output voltage.

Figure 4:
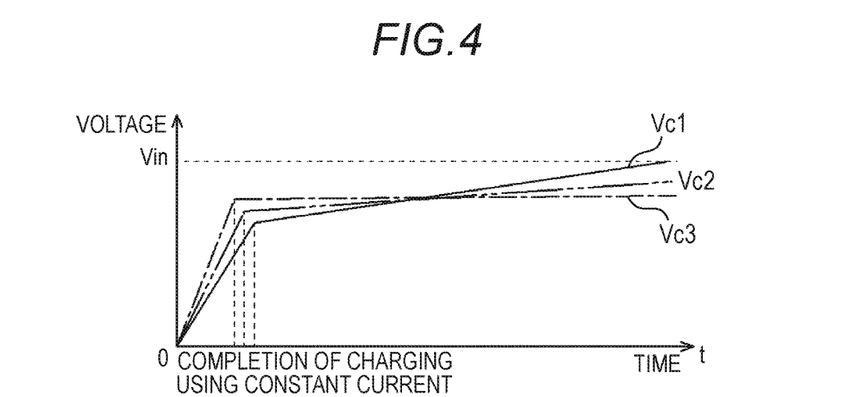
FIG. 4 is a diagram illustrating the change in the inter-terminal voltage of a capacitor.

Here, it is assumed that the current path maintaining unit 30 is configured with three types of resistors having different resistance values from each other. FIG. 4 illustrates the waveform of the voltage Vc of the positive terminal of the capacitor 3 at this time. In FIG. 4, Vc1 indicates the waveform when the resistor having the smallest resistance value is used, Vc3 indicates the waveform when the resistor having the largest resistance value is used, and Vc2 indicates the waveform when the resistor having the resistance value between the smallest resistance value and the largest resistance value is used, among the three types of resistors. As illustrated in FIG. 4, the charging using the constant current is quickly completed by the extent to which the time constant τ is small (extent to which the slope of the initial period is small). Therefore, the resistance value of the resistor is set to be small, and thus it is possible to increase the subsequent charging current, thereby quickly charging the capacitor 3. In the current path maintaining unit 30, any of the plurality of resistors may have the resistance value of 0Ω.

3. Third Embodiment

In the second embodiment described above, the configuration in which the resistance value of the resistor of the current path maintaining unit 30 is changed according to the estimated capacitance value of the capacitor 3 is described. However, the configuration of the present embodiment is different from that of the second embodiment in that the resistance value of the resistor of the current path maintaining unit 30 is changed according to the difference between the output voltage of the power supply 2 and the inter-terminal voltage of the capacitor 3. The other configurations are similar to those of the second embodiment, and thus, hereinafter, the main differences will be described.

Figure 5:
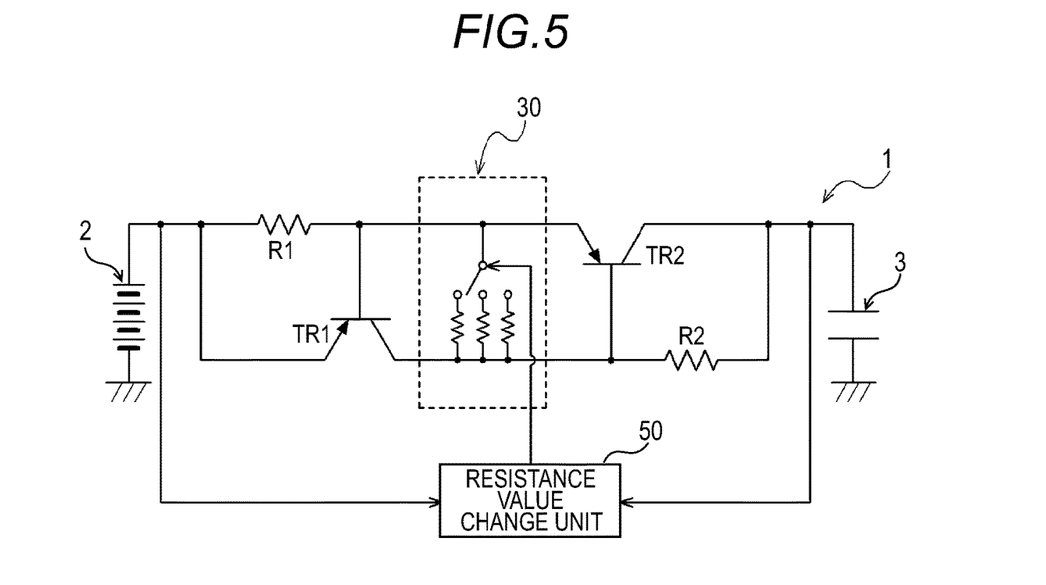
FIG. 5 is a circuit diagram of a charging circuit according to a third embodiment.

FIG. 5 illustrates a circuit diagram of a charging circuit 1 according to the present embodiment. As illustrated in FIG. 5, the charging circuit 1 according to the present embodiment is configured to include a transistor TR1, a transistor TR2, a resistor R1, a resistor R2, a current path maintaining unit 30, and a resistance value change unit 50. The transistor TR1, the transistor TR2, the resistor R1, and the resistor R2 are the same as those of the second embodiment, and thus the description thereof is omitted.

The resistance value change unit 50 acquires the voltage value of the output voltage of the power supply 2. The output voltage of the power supply 2 corresponds to the input voltage of the charging circuit 1. In addition, the resistance value change unit 50 acquires the measurement result of the inter-terminal voltage of the capacitor 3. The inter-terminal voltage of the capacitor 3 is the potential difference between the positive terminal and the negative terminal of the capacitor 3. In the present embodiment, the negative terminal is grounded, and thus the inter-terminal voltage of the capacitor 3 corresponds to the voltage value of the positive terminal of the capacitor 3. The resistance value change unit 50 calculates the difference (potential difference) between the acquired voltage value of the output voltage of the power supply 2 and the voltage value of the positive terminal of the capacitor 3.

The resistance value change unit 50 calculates the allowable power dissipation of the resistor R1 and the resistor R2, and the current value that can flow through the resistor R1 and the resistor R2 according to the potential difference obtained by the calculation. The resistance value change unit 50 changes the resistance value of the resistor of the current path maintaining unit 30 based on the current value. More specifically, when it is assumed that Vin is the voltage value of the output voltage of the power supply 2, that Vc is the inter-terminal voltage of the capacitor 3, and that r1 and r2 are respectively the resistance value of the resistor R1 and the resistance value of the resistor R2, the resistance value r of the resistor of the current path maintaining unit 30 is obtained by the following equation (2).

$$r = (Vin - Vc)/I - (r1 + r2) \qquad (2)$$

Here, I is the smaller one of the maximum current value that can flow through the resistor R1 and the maximum current value that can flow through the resistor R2, the maximum current values obtained by the allowable power dissipation in consideration of a load reduction curve. Therefore, the resistance value of the resistor of the current path maintaining unit 30 is set to the value that is equal to or larger than the value obtained by the equation (2).

Figure 6:
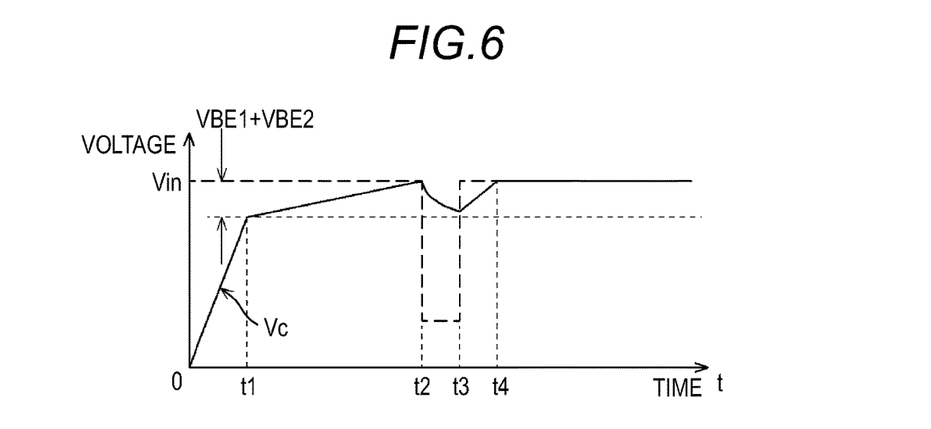
FIG. 6 is a diagram illustrating the change in the inter-terminal voltage of a capacitor.

The resistance value of the resistor of the current path maintaining unit 30 is set in this manner, and thus, as illustrated in FIG. 6, the input voltage Vin decreases between t=t2 and t=t3 during the charging of the capacitor 3. Even in a case where the voltage Vc of the positive terminal of the capacitor 3 decreases, when the input voltage Vin is restored and the charging is restarted, the resistance value of the resistor of the current path maintaining unit 30 is set as described above, if the voltage Vc is equal to or larger than "Vin−VBE1-VBE2". Therefore, it is possible to charge the capacitor 3 to the power supply voltage in a shorter time (the time from t=t3 to t=t4) than the time (the time from t=t1 to t=t2) for which the charging is performed via the resistor of the current path maintaining unit 30 before the input voltage Vin is decreased, without damaging the resistor R1 and the resistor R2. In addition, for example, if the voltage Vc when the input voltage Vin is restored and the charging is restarted is less than "Vin−VBE1-VBE2", the charging may be performed via the transistor TR1 and the transistor TR2. In the current path maintaining unit 30, any of the plurality of resistors may have the resistance value of 0Ω.

4. Another Embodiment

Figure 7:
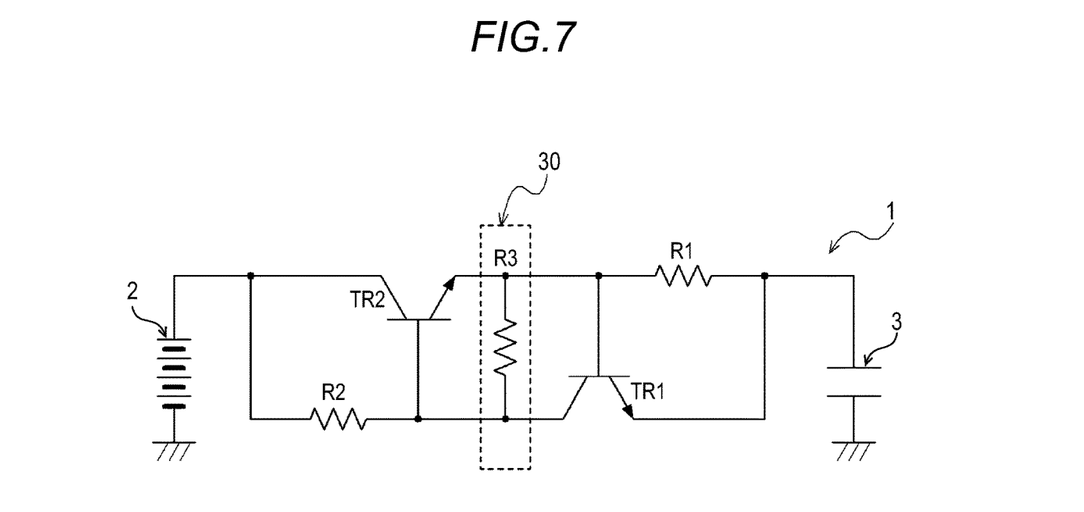
FIG. 7 is a circuit diagram of a charging circuit according to another embodiment.

In the embodiments described above, although the transistor TR1 and the transistor TR2 are configured with a PNP-type bipolar transistor, as illustrated in FIG. 7, the transistor TR1 and the transistor TR2 may be configured with a NPN bipolar transistor. In this case, the charging circuit 1 is configured as follows.

The charging circuit 1 is configured to include a first NPN-type transistor TR1, a second NPN-type transistor TR2, a first resistor R1, a second resistor R2, and a current path maintaining unit 30. The emitter terminal of the first NPN-type transistor TR1 is connected to the positive terminal of the capacitor 3, and the first resistor R1 is connected between the emitter terminal of the first NPN-type transistor TR1 and the base terminal of the first NPN-type transistor TR1. The collector terminal of the second NPN-type transistor TR2 is connected to the positive terminal of the power supply 2, and the second resistor R2 is connected between the collector terminal of the second NPN-type transistor TR2 and the base terminal of the second NPN-type transistor TR2.

Further, the base terminal of the first NPN-type transistor TR1 is connected to the emitter terminal of the second NPN-type transistor TR2, and the collector terminal of the first NPN-type transistor TR1 is connected to the base terminal of the second NPN-type transistor TR2.

The second NPN-type transistor TR2 outputs a current of a predetermined set current value or less, and the current path maintaining unit 30 is provided between the collector terminal of the first NPN-type transistor TR1 and the emitter terminal of the second NPN-type transistor TR2. Accordingly, even when the first NPN-type transistor TR1 and the second NPN-type transistor TR2 are in a non-operation state, it is possible to maintain (form) the current path from the power supply 2 to the capacitor 3 using the first resistor R1, the second resistor R2, and the current path maintaining unit 30.

In addition, similarly to the embodiments described above, the set current value is set by the first resistor R1 and the first NPN-type transistor TR1, and the current path maintaining unit 30 may be configured with a third resistor R3. In this case, the resistance value of the third resistor R3 is set based on the set current value. Even in the configuration, the inter-terminal voltage of the capacitor 3 can be quickly reached to the power supply voltage after the capacitor 3 is charged using the constant current.

The embodiments disclosed here can be applied to a charging circuit that charges a capacitor.

A feature of a charging circuit according to an aspect of this disclosure for charging a capacitor using the power that is output from a power supply resides in that the charging circuit includes a first PNP-type transistor, a second PNP-type transistor, a first resistor, a second resistor, and a current path maintaining unit, in which the power supply is connected to the emitter terminal of the first PNP-type transistor, in which the first resistor is connected between the emitter terminal of the first PNP-type transistor and the base terminal of the first PNP-type transistor, in which the capacitor is connected to the collector terminal of the second PNP-type transistor, in which the second resistor is connected between the collector terminal of the second PNP-type transistor and the base terminal of the second PNP-type transistor, in which the base terminal of the first PNP-type transistor is connected to the emitter terminal of the second PNP-type transistor, in which the collector terminal of the first PNP-type transistor is connected to the base terminal of the second PNP-type transistor, in which the second PNP-type transistor outputs a current of a predetermined set current value or less, in which the current path maintaining unit is provided between the collector terminal of the first PNP-type transistor and the emitter terminal of the second PNP-type transistor, and in which a current path from the power supply to the capacitor is formed using the first resistor, the second resistor, and the current path maintaining unit.

With this configuration, when the capacitor is charged using a constant current, even in a case where the first PNP-type transistor and the second PNP-type transistor are in a non-operation state, it is possible to maintain the current path until the current that is output from the power supply reaches to the capacitor using the first resistor, the second resistor, and the current path maintaining unit. Therefore, even in the case where the first PNP-type transistor and the second PNP-type transistor are in a non-operation state, it is possible to ensure the charging current larger than at least the leakage current of the first PNP-type transistor and the second PNP-type transistor, and thus it is possible to quickly charge the capacitor.

A feature of a charging circuit according to another aspect of this disclosure for charging a capacitor using the power that is output from a power supply resides in that the charging circuit includes a first NPN-type transistor, a second NPN-type transistor, a first resistor, a second resistor, and a current path maintaining unit, in which the capacitor is connected to the emitter terminal of the first NPN-type transistor, in which the first resistor is connected between the emitter terminal of the first NPN-type transistor and the base terminal of the first NPN-type transistor, in which the power supply is connected to the collector terminal of the second NPN-type transistor, in which the second resistor is connected between the collector terminal of the second NPN-type transistor and the base terminal of the second NPN-type transistor, in which the base terminal of the first NPN-type transistor is connected to the emitter terminal of the second NPN-type transistor, in which the collector terminal of the first NPN-type transistor is connected to the base terminal of the second NPN-type transistor, in which the second NPN-type transistor outputs a current of a predetermined set current value or less, in which the current path maintaining unit is provided between the collector terminal of the first NPN-type transistor and the emitter terminal of the second NPN-type transistor, and in which a current path from the power supply to the capacitor is formed using the first resistor, the second resistor, and the current path maintaining unit.

Even in this configuration, when the capacitor is charged using a constant current, even in a case where the first NPN-type transistor and the second NPN-type transistor are in a non-operation state, it is possible to maintain the current path until the current that is output from the power supply reaches to the capacitor using the first resistor, the second resistor, and the current path maintaining unit. Therefore, even in the case where the first NPN-type transistor and the second NPN-type transistor are in a non-operation state, it is possible to ensure the charging current larger than at least the leakage current of the first NPN-type transistor and the second NPN-type transistor, and thus it is possible to quickly charge the capacitor.

In the charging circuit, it is preferable that the set current value is set by the first resistor and the first PNP-type transistor, the current path maintaining unit is configured with a third resistor, and the resistance value of the third resistor is set based on the set current value.

With this configuration, it is possible to set the current value of the current flowing through the first resistor and the second resistor according to the resistance value of the third resistor of the current path maintaining unit. Therefore, the resistance value of the third resistor of the current path maintaining unit is set based on the allowable power dissipation of the first resistor and the second resistor, and thus it is possible to prevent the damage of the first resistor and the second resistor.

In the charging circuit, it is preferable that the set current value is set by the first resistor and the first NPN-type transistor, the current path maintaining unit is configured with a third resistor, and the resistance value of the third resistor is set based on the set current value.

With this configuration, it is possible to set the current value of the current flowing through the first resistor and the second resistor according to the resistance value of the third resistor of the current path maintaining unit. Therefore, the resistance value of the third resistor of the current path maintaining unit is set based on the allowable power dissipation of the first resistor and the second resistor, and thus it is possible to prevent the damage of the first resistor and the second resistor.

It is preferable that the charging circuit further includes an estimation unit that estimates the current capacitance value of the capacitor, and the resistance value of the third resistor is set based on the capacitance value estimated by the estimation unit.

With this configuration, when the capacitor is not deteriorated, the resistance value is set to be large, and thus it is possible to quickly charge the capacitor to a predetermined voltage. When the capacitor is deteriorated, the resistance value is set to be small, and thus, after all of the transistors are in a non-operation state, it is possible to ensure the charging current larger than the leakage current of the transistor. Therefore, it is possible to shorten the time until the inter-terminal voltage of the capacitor reaches to the output voltage of the power supply.

In the charging circuit, it is preferable that the resistance value of the third resistor is changed based on the difference between the output voltage of the power supply and the inter-terminal voltage of the capacitor and the allowable power dissipation of the first resistor and the second resistor.

With this configuration, during or after the charging of the capacitor, even in a case where the output voltage of the power supply decreases once for any reason and then the output voltage is restored to a desired value, it is possible to quickly charge the capacitor while preventing an excessive current from flowing through the first resistor and the second resistor. Therefore, it is possible to prevent the damage of the first resistor and the second resistor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A charging circuit that charges a capacitor using the power that is output from a power supply, comprising:
   a first PNP-type transistor;
   a second PNP-type transistor;
   a first resistor;
   a second resistor; and
   a current path maintaining unit,
   wherein the power supply is connected to the emitter terminal of the first PNP-type transistor,
   the first resistor is connected between the emitter terminal of the first PNP-type transistor and the base terminal of the first PNP-type transistor,
   the capacitor is connected to the collector terminal of the second PNP-type transistor,
   the second resistor is connected between the collector terminal of the second PNP-type transistor and the base terminal of the second PNP-type transistor,
   the base terminal of the first PNP-type transistor is connected to the emitter terminal of the second PNP-type transistor,
   the collector terminal of the first PNP-type transistor is connected to the base terminal of the second PNP-type transistor,
   the second PNP-type transistor outputs a current of a predetermined set current value or less,
   the current path maintaining unit is provided between the collector terminal of the first PNP-type transistor and the emitter terminal of the second PNP-type transistor, and
   a current path from the power supply to the capacitor is formed using the first resistor, the second resistor, and the current path maintaining unit.

2. A charging circuit that charges a capacitor using the power that is output from a power supply, comprising:
   a first NPN-type transistor;
   a second NPN-type transistor;
   a first resistor;
   a second resistor; and
   a current path maintaining unit,
   wherein the capacitor is connected to the emitter terminal of the first NPN-type transistor, the first resistor is connected between the emitter terminal of the first NPN-type transistor and the base terminal of the first NPN-type transistor, the power supply is connected to the collector terminal of the second NPN-type transistor, the second resistor is connected between the collector terminal of the second NPN-type transistor and the base terminal of the second NPN-type transistor, the base terminal of the first NPN-type transistor is connected to the emitter terminal of the second NPN-type transistor, the collector terminal of the first NPN-type transistor is connected to the base terminal of the second NPN-type transistor, the second NPN-type transistor outputs a current of a predetermined set current value or less, the current path maintaining unit is provided between the collector terminal of the first NPN-type transistor and the emitter terminal of the second NPN-type transistor, and a current path from the power supply to the capacitor is formed using the first resistor, the second resistor, and the current path maintaining unit.

3. The charging circuit according to claim 1, wherein the predetermined set current value is set by the first resistor and the first PNP-type transistor, the current path maintaining unit is configured with a third resistor, and a resistance value of the third resistor is set based on the predetermined set current value.

4. The charging circuit according to claim 2, wherein the predetermined set current value is set by the first resistor and the first NPN-type transistor, the current path maintaining unit is configured with a third resistor, and a resistance value of the third resistor is set based on the predetermined set current value.

5. The charging circuit according to claim 3, further comprising:

an estimation unit that estimates a current capacitance value of the capacitor, wherein the resistance value of the third resistor is set based on the capacitance value estimated by the estimation unit.

6. The charging circuit according to claim 4, further comprising:

an estimation unit that estimates a current capacitance value of the capacitor, wherein the resistance value of the third resistor is set based on the capacitance value estimated by the estimation unit.

7. The charging circuit according to claim 3, wherein the resistance value of the third resistor is changed based on the difference between an output voltage of the power supply and an inter-terminal voltage of the capacitor and an allowable power dissipation of the first resistor and the second resistor.

8. The charging circuit according to claim 4, wherein the resistance value of the third resistor is changed based on the difference between an output voltage of the power supply and an inter-terminal voltage of the capacitor and an allowable power dissipation of the first resistor and the second resistor.

9. The charging circuit according to claim 5, wherein the resistance value of the third resistor is changed based on the difference between an output voltage of the power supply and an inter-terminal voltage of the capacitor and an allowable power dissipation of the first resistor and the second resistor.

10. The charging circuit according to claim 6, wherein the resistance value of the third resistor is changed based on the difference between an output voltage of the power supply and an inter-terminal voltage of the capacitor and an allowable power dissipation of the first resistor and the second resistor.

* * * * *